(12) United States Patent
Christov et al.

(10) Patent No.: US 10,443,596 B2
(45) Date of Patent: Oct. 15, 2019

(54) SCREW PUMP WITH VAPOR BARRIER

(71) Applicant: Jung & Co. Geratebau GmbH, Kummerfeld (DE)

(72) Inventors: Weshen Christov, Buckeburg (DE); Hans Jung, Pinneberg (DE)

(73) Assignee: Jung & Co. Geratebau GmbH, Auweg (DE)

( * ) Notice: Subject to any disclaimer, the term of this patent is extended or adjusted under 35 U.S.C. 154(b) by 530 days.

(21) Appl. No.: 14/806,528

(22) Filed: Jul. 22, 2015

(65) Prior Publication Data
US 2016/0061200 A1 Mar. 3, 2016

(30) Foreign Application Priority Data
Aug. 11, 2014 (DE) .......................... 10 2014 011 658

(51) Int. Cl.
*F04C 15/00* (2006.01)
*F04C 2/16* (2006.01)
(Continued)

(52) U.S. Cl.
CPC ........ *F04C 15/0007* (2013.01); *F01C 19/005* (2013.01); *F04C 2/16* (2013.01);
(Continued)

(58) Field of Classification Search
CPC .............. F01C 19/005; F04C 15/0007; F04C 15/0026; F04C 15/0034; F16J 15/18; F16J 15/182
See application file for complete search history.

(56) References Cited

U.S. PATENT DOCUMENTS 3,975,123 A * 8/1976 Schibbye .............. F04C 27/009
277/432
4,394,113 A * 7/1983 Bammert .............. F04C 27/009
418/201.2
(Continued)

FOREIGN PATENT DOCUMENTS

DE 200104621 B4 2/2014
WO PCT/EP2001/109479 A9 9/2002

*Primary Examiner* — Audrey K Bradley
*Assistant Examiner* — Anthony Ayala Delgado
(74) *Attorney, Agent, or Firm* — Mark Rodgers

(57) ABSTRACT

A dual-spindle screw pump having a pump housing (11) for a medium to be conveyed, in particular a foodstuff, which has a pump section (12), at least one bearing section (16) and at least one gear section (17), wherein the at least one bearing section (16) and the pump section (12) are constructed separately from one another, wherein the pump section is a product chamber (26) through which the medium is conveyed, having a conveyor housing part (13) as a constituent part of the pump section (12) in which two conveying screws (20, 21) that are arranged on shafts (18, 19) are provided, having at least one feed section (22) and at least one removal section (23) as constituent parts of the pump section (12), preferably each having a connection flange (24, 25), wherein the product chamber (26) has at least one parting line (28) having a connection to the surrounding atmosphere (29), which is provided with a vapor barrier (30) having a groove (31) as the vapor channel (38), characterized in that there is provided in the groove (31) at least one seal (40) which seals the vapor channel (38) off from the product chamber (26) and from the surrounding atmosphere (29).

14 Claims, 7 Drawing Sheets

Figure 1:
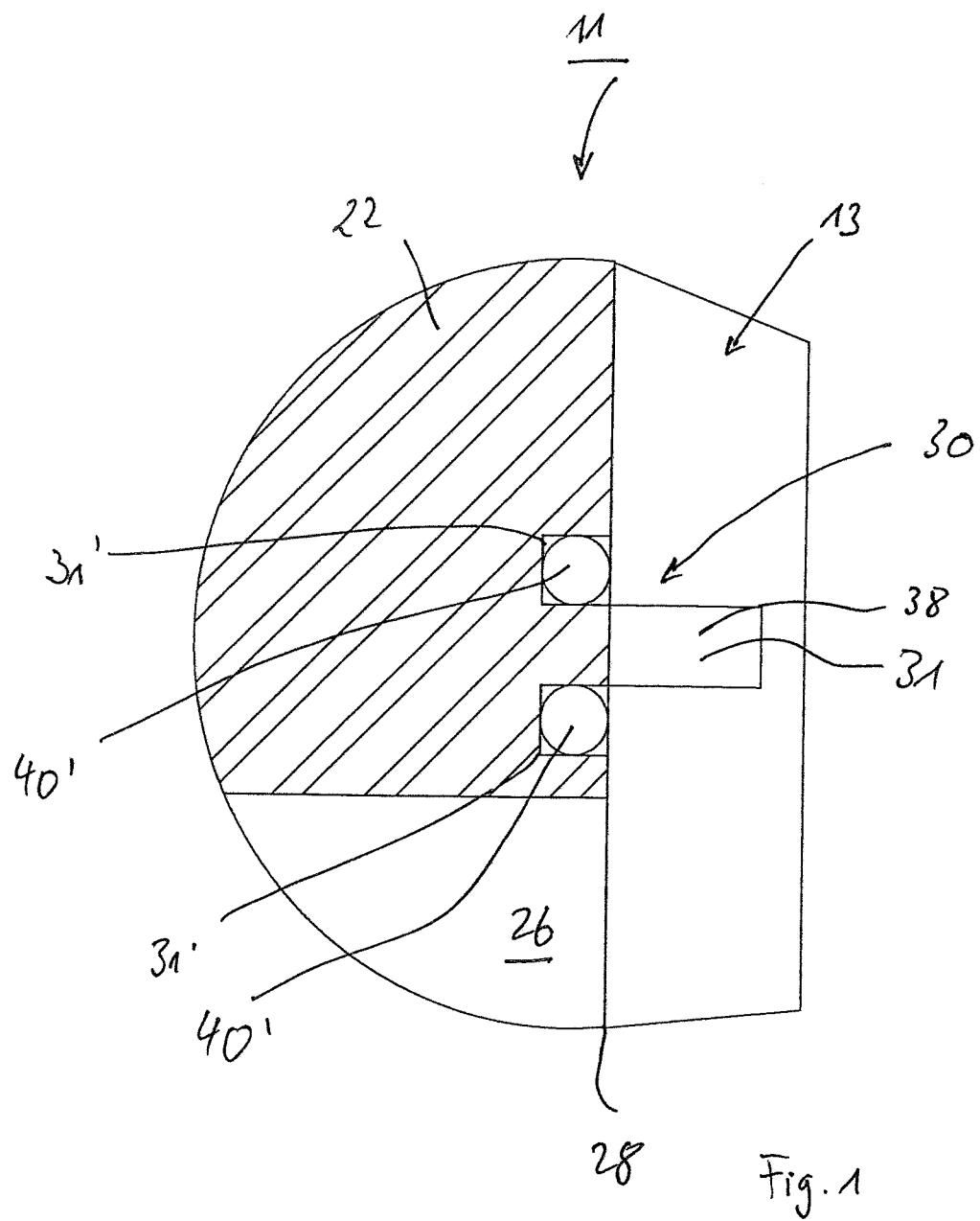

(51) Int. Cl.
  *F04C 15/06*     (2006.01)
  *F01C 19/00*     (2006.01)
  *F16J 15/04*     (2006.01)

(52) U.S. Cl.
  CPC ...... *F04C 15/0026* (2013.01); *F04C 15/0034* (2013.01); *F04C 15/06* (2013.01); *F16J 15/04* (2013.01)

(56) References Cited

U.S. PATENT DOCUMENTS

| | | | | |
|---|---|---|---|---|
| 5,085,443 | A * | 2/1992 | Richards | B04B 3/02 |
| | | | | 277/412 |
| 8,529,234 | B2 * | 9/2013 | Yoshimura | F01C 19/005 |
| | | | | 277/303 |
| 9,022,760 | B2 * | 5/2015 | Bakkestuen | F04C 27/009 |
| | | | | 417/423.13 |
| 2002/0047100 | A1 * | 4/2002 | Lorraine | F02M 51/0603 |
| | | | | 251/57 |
| 2013/0202473 | A1 | 8/2013 | Christov et al. | |
| 2013/0251581 | A1 | 9/2013 | Christov et al. | |

* cited by examiner

Stand der Technik

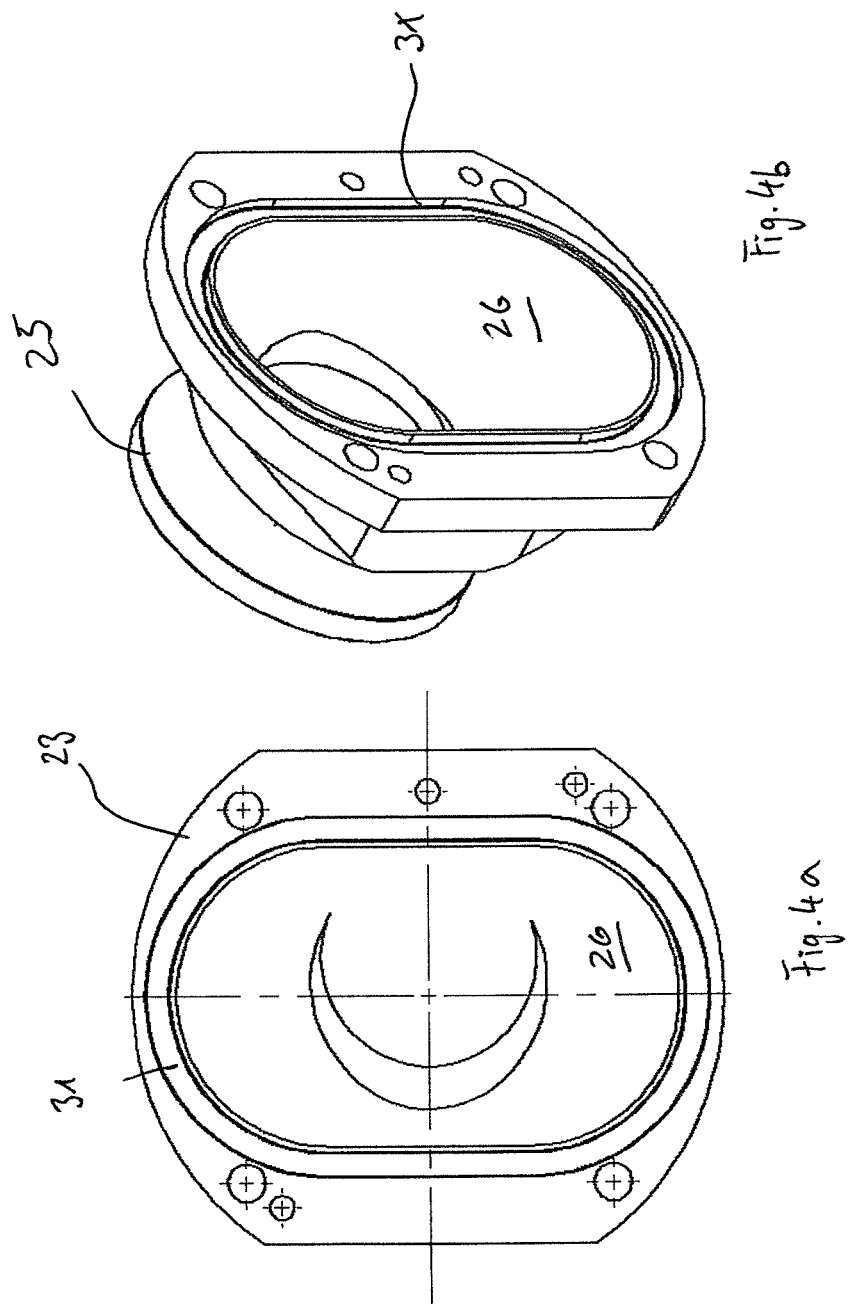

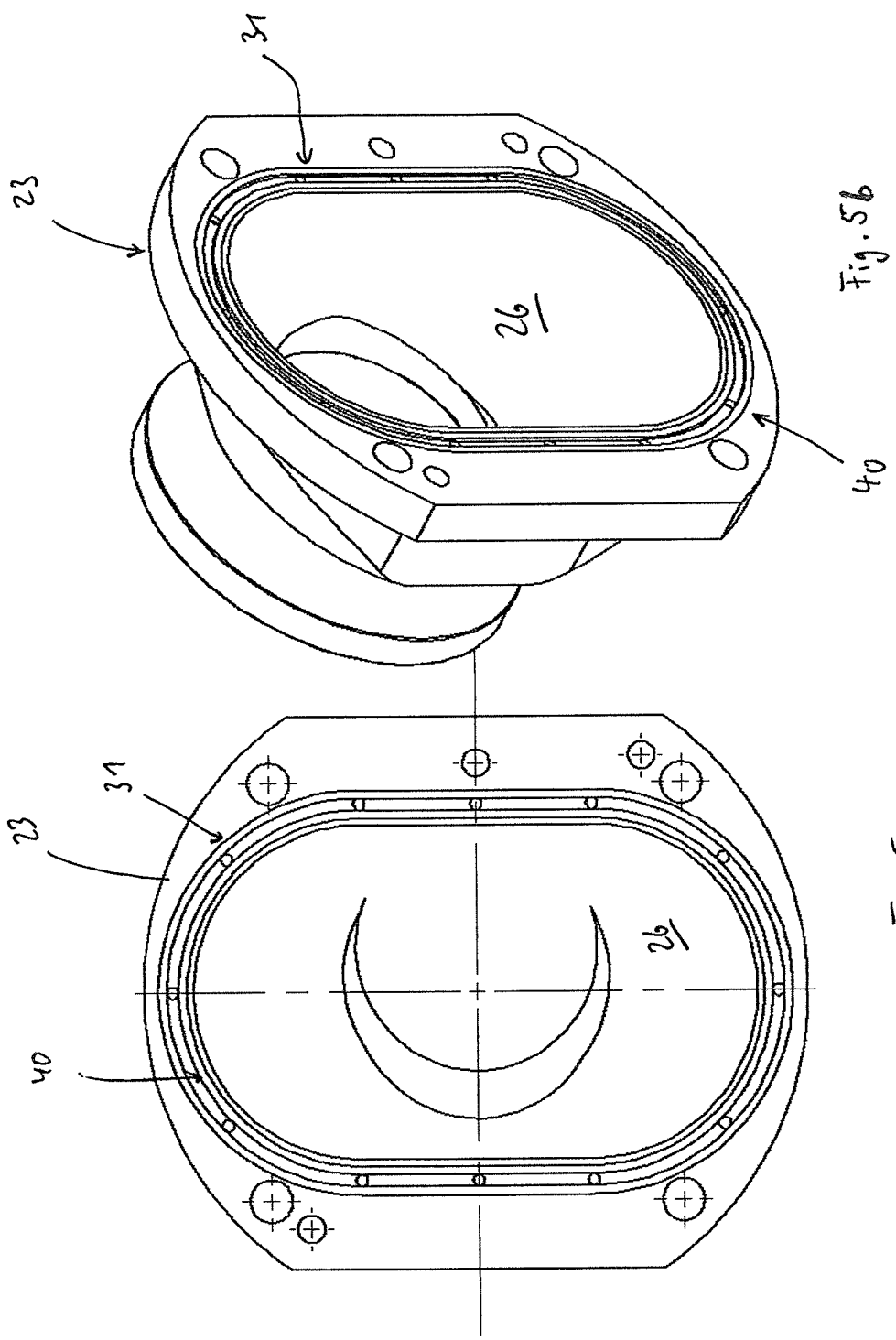

SCREW PUMP WITH VAPOR BARRIER

The invention relates to a dual-spindle screw pump having a pump housing for a medium to be conveyed, in particular a foodstuff, which has a pump section, at least one bearing section and at least one gear section, wherein the at least one bearing section and the pump section are constructed separately from one another, wherein the pump section is a product chamber through which the medium is conveyed, having a conveyor housing part as a constituent part of the pump section in which two conveying screws that are arranged on shafts are provided, having at least one feed section and at least one removal section as constituent parts of the pump section, preferably each having a connection flange, wherein the product chamber has at least one parting line having a connection to the surrounding atmosphere, which is provided with a vapor barrier having a groove as the vapor channel.

A pump construction of this kind is known from DE 10 2012 001 700 A1. These pumps are characterized in particular by operation that is gentle on the product and, associated with this, low wear. The disclosed screw pump is provided with mechanical seals between the pump section and the bearing section. This makes in particular reversible conveying possible. As a result of this, the mechanical seal lies at the inlet or outlet of the pump. The conveying screws are located in the pump housing, inside the pump section. They are surrounded by the conveyor housing part and together form conveyor chambers. The conveying screws are mounted on the shafts, which end in a gear section. Arranged on the shafts in the housing section are toothed gears by means of which the shafts are coupled such that they are entrained in rotation.

The conveying screws are arranged such that they are in engagement. They each have a corresponding pitch and a corresponding width of the screw turns. Between the screw turns are the conveyor chambers. During rotation of the shafts and hence of the conveying screws, the medium to be pumped is displaced in these conveyor chambers, from the inlet to the outlet. As an alternative, however, a pump as disclosed for example in DE 10 2012 005 949 A1 is also possible, in which the screws are mounted on two sides.

A vapor barrier for pumps of this kind is disclosed as prior art in FIG. 1. The objective of vapor barriers of this kind is to prevent bacteria from the surrounding atmosphere from entering the product chamber of the pump by guiding hot vapor into the vapor barrier to kill the bacteria.

FIG. 1 illustrates a vapor barrier 30 at a parting line in a pump housing 11, which has in a first structural part 13 a groove 31 as the vapor channel 38, and in a second structural part 22 (which when joined form the parting line 28) two grooves 31' for sealing the vapor channel, wherein a seal 40' in the form of a sealing ring is inserted into each of these grooves 31'. A vapor barrier of this kind would benefit from improvement, since it is cost-intensive and it is frequently difficult to manufacture the three peripheral grooves appropriately, in particular because of their size.

It is an object of the invention to provide a vapor barrier that is simpler and more cost-effective to manufacture.

The object is achieved in that there is provided in the groove at least one seal which seals the vapor channel off from the product chamber and from the surrounding atmosphere.

As a result, only one groove is required, and this can be made larger, so it is simpler to manufacture.

A further teaching of the invention provides for the seal to have a first wall portion and a second wall portion for sealing off the vapor channel, which are preferably arranged parallel and/or concentric to one another and are connected by a connection portion. This construction forms an embodiment of the seal to be used that is particularly simple to realize and efficient.

A further teaching of the invention provides for the connection portion to have openings for vapor to pass through. As a result, a particularly good distribution of vapor in the vapor barrier is achieved.

A further teaching of the invention provides for there to be two vapor channels through the seal that is inserted in the groove. As a result, a particularly efficient distribution of vapor is ensured with a correspondingly good action to prevent germs from penetrating.

A further teaching of the invention provides for the seal to be made from an elastomer, at least in certain portions.

A further teaching of the invention provides for there to be at least one parting line between the conveyor housing part, the feed section and/or the removal section. A further teaching of the invention provides for the vapor channel to have at least one inlet, preferably in the form of a vapor inlet and/or arranged on the upper side of the pump housing, and at least one outlet, preferably in the form of a condensate drain and/or arranged on the underside of the pump housing. A further teaching of the invention provides for it to be a screw pump of single-flow construction having a bearing section, wherein the shafts are preferably borne in the bearing section (outside bearing) and extend into the gear section, or to be a screw pump of dual-flow construction having two bearing sections, wherein the shafts are preferably borne in a first bearing section (outside bearing) and borne in a second bearing section that takes the form of an outer bearing or inner bearing in the pump section.

The object is further achieved by a sealing ring, preferably made from an elastomer, having a first wall portion and a second wall portion, which are preferably arranged parallel and/or concentric to one another and are connected by at least one connection portion, such that at least two u-shaped spatial delimitations are present, which enclose at least two chambers on three sides, wherein the at least one connection portion has at least one opening for connecting the at least two chambers, wherein the at least one opening enables fluid to pass through, and the at least two chambers form a vapor channel.

The object is further achieved by the use of an above-described sealing ring in a screw pump, in particular of the type described above.

Figure 2:
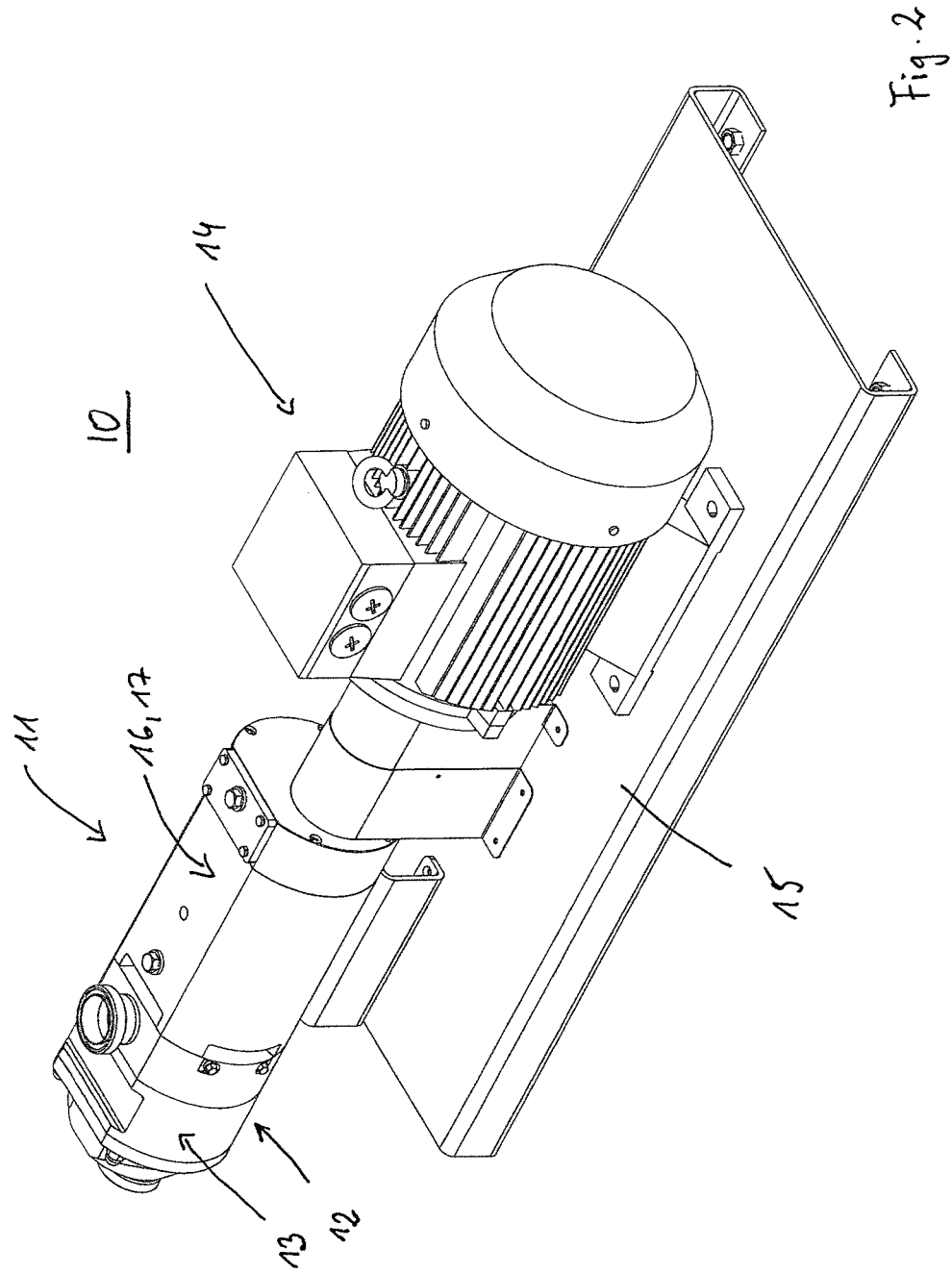
Figure 3:
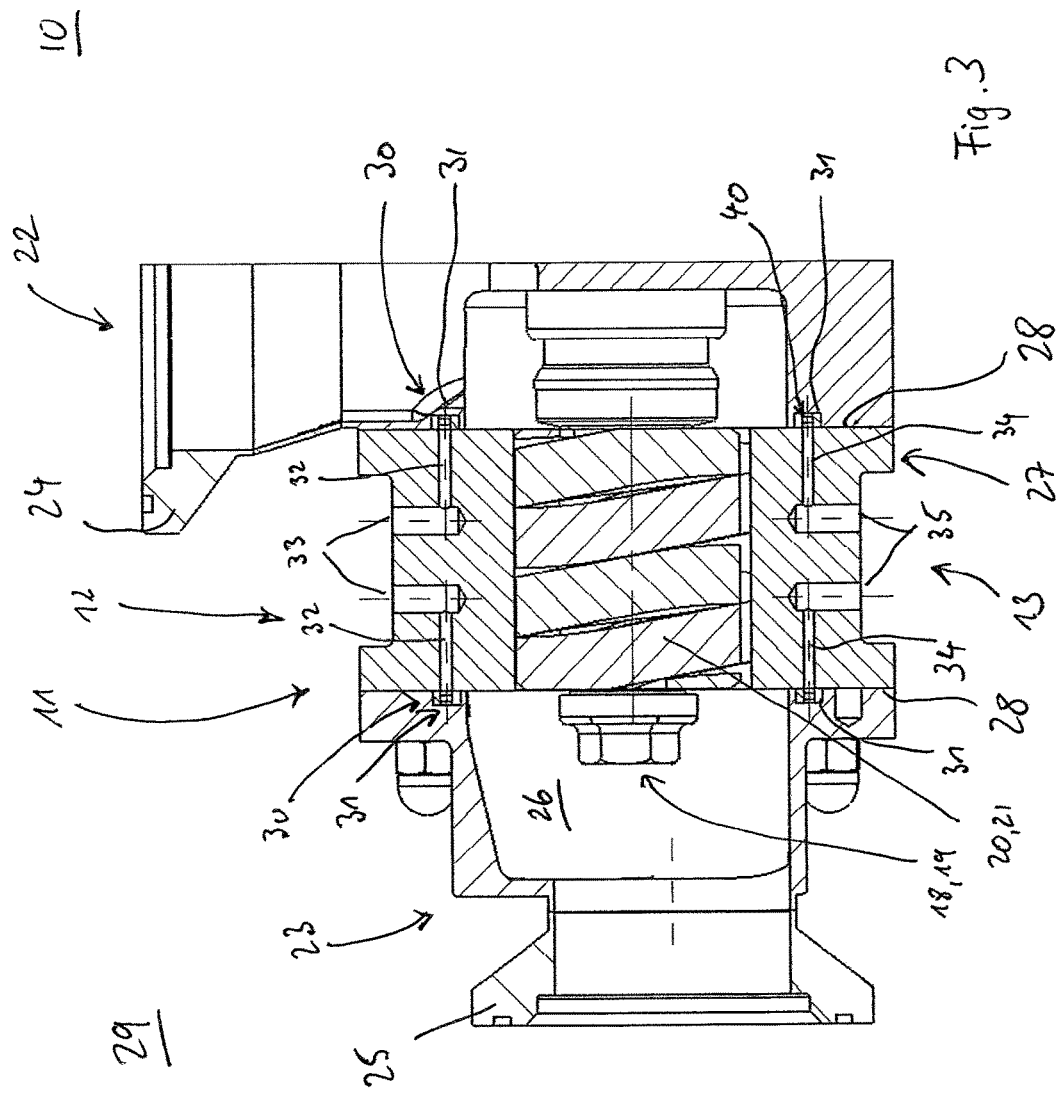
Figure 6A:
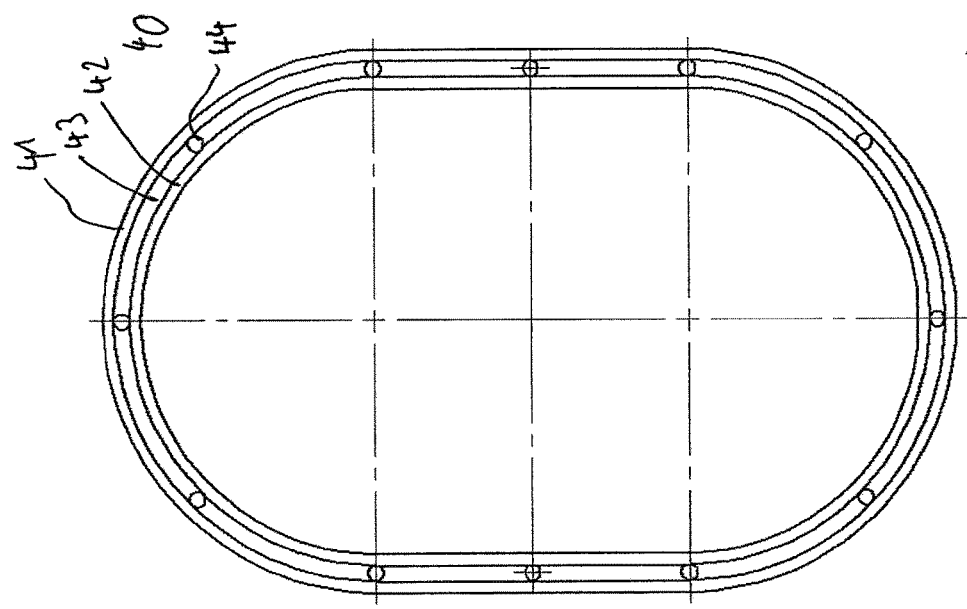
Figure 6B:
Figure 7:
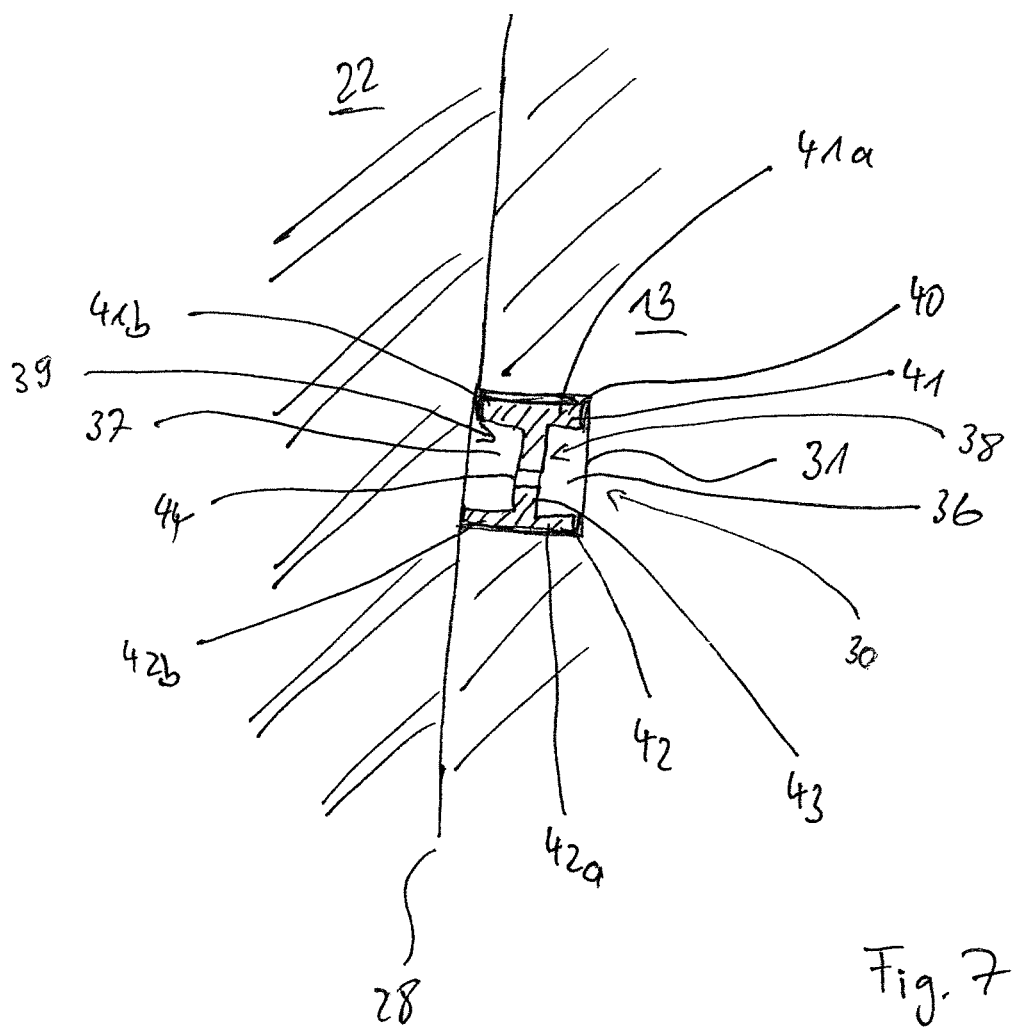

The invention will be explained in more detail below with reference to an exemplary embodiment and in conjunction with a drawing, in which:

FIG. 1 shows a sectional view of a vapor barrier of a pump of the prior art, FIG. 2 shows a perspective view of a pump according to the invention, FIG. 3 shows a sectional view of FIG. 2, FIGS. 4a, 4b show a side view and a perspective view of a section of a pump having a groove of a vapor barrier from FIG. 2, FIGS. 5a, 5b show a side view and a perspective view of a section of a pump having a groove of a vapor barrier with the seal inserted, from FIG. 2, FIGS. 6a, 6b show a side view and a perspective view of a seal according to the invention, and FIG. 7 shows a sectional view of a vapor barrier according to the invention.

FIG. 2 shows a screw pump 10 having a pump housing 11 and a drive 14, which are arranged on a base plate 15. The pump housing 11 has a pump section 12, which is illustrated in sectional view in FIG. 3. Here, the pump section 12 features a conveyor housing part 13 in which there are arranged two conveying screws 20, 21 that are arranged on shafts 18, 19 and are in engagement. Secured to the conveyor housing part 13 is a feed section 22 and a removal section 23, which are each provided with a connection flange 24, 25, by way of which the pump 10 is connected and integrated in the cycle of the medium to be conveyed. The feed section 22 itself has a connection (not illustrated here) to the bearing section 16 and the gear section 17.

The inner chamber 26 is at the same time the product chamber in which the medium to be conveyed is moved. The product chamber 26 is in this case surrounded by the housing 27 of the pump section 12, which is formed by the feed section 22, the conveyor housing part 13 and the removal section 23. Between the feed section 22 and the conveyor housing part 13, and between the conveyor housing part 13 and the removal section 23, there is in each case a parting line 28 that connects the product chamber 26 to the surrounding atmosphere 29.

Arranged in each of the parting lines 28 is a vapor barrier 30. The vapor barrier 30 includes a groove 31, which in this embodiment is arranged respectively in the feed section 22 and the removal section 23. In the conveyor housing part 13 there are provided supply channels 32 that are connected to an inlet bore 33, through which vapor is introduced into the grooves 31 by way of the supply channels 32.

FIGS. 4a and 4b show the groove 31 that is arranged in the removal section 23. This groove 31 is provided running around in a ring shape. Arranged in the groove 31, as illustrated in FIGS. 5a and 5b, is a seal 40. The seal 40 is illustrated in FIGS. 6a and 6b.

On the underside of the groove 31 there are provided drain bores 35, which are connected by way of drain channels 34 with the groove 31. By way of the drain channels 34 and the drain bores 35, either excess vapor leaves the vapor barrier 30, or condensate that has formed as a result of cooling of the vapor in the groove 31 flows away.

The seal 40 has a first wall portion 41 and, parallel thereto or, in the curved regions, concentric thereto, a second wall portion 42. The two wall portions 41, 42 are connected by way of a connecting bridge 43, which in this case is arranged at a right angle on the wall portions 41, 42. Bores 44 are provided in the connection web 43 and vapor or condensate can pass through these.

The connecting bridge 43 divides the wall portion 41 into a wall portion part 41a and a wall portion part 41b. The same applies to the wall portion 42, which the connecting bridge 43 divides into a wall portion part 42a and a wall portion part 42b.

The wall portion part 41a, the connecting bridge 43 and the wall portion part 42a form a u-shaped wall that surrounds a chamber 36. The same applies to the wall portion part 41b, the connection web 43 and the wall portion part 42b, which form a u-shaped wall and enclose a chamber 37. The chamber 36 and the chamber 37 are each a vapor channel 38, 39. It has been found that the provision of these two vapor channels 38, 39 provides a particularly good action of the vapor barrier 30. The arrangement of the seal 40 in the groove 31 is illustrated in particular in FIG. 7.

The wall portions 41, 42 and the connecting bridge 43 are formed by an elastomer. The wall portions 41, 42 seal the parting line 28 off from the vapor channels 38, 39.

10 Screw pump
11 Pump housing
12 Pump section
13 Conveyor housing part
14 Drive
15 Base plate
16 Bearing section
17 Gear section
18 Shaft
19 Shaft
20 Conveying screw
21 Conveying screw
22 Feed section
23 Removal section
24 Connection flange
25 Connection flange
26 Inner chamber/product chamber
27 Housing
28 Parting line
29 Surrounding atmosphere
30 Vapor barrier
31 Groove
31' Groove
32 Supply channel
33 Inlet bore
34 Drain channel
35 Drain bore
36 Chamber
37 Chamber
38 Vapor channel
39 Vapor channel
40 Seal
40' Seal
41 Wall portion
41a Wall portion
41b Wall portion part
42 Wall portion
42a Wall portion part
42b Wall portion part
43 Connecting Bridge
44 Opening

The invention claimed is:

1. A dual-spindle screw pump having a pump housing for a medium to be conveyed, in particular a foodstuff, comprising:
  a pump section,
  at least one bearing section, and
  at least one gear section,
  wherein the at least one bearing section and the pump section are constructed separately from one another,
  wherein the pump section is a product chamber through which the medium is conveyed, comprising:
    a conveyor housing part as a constituent part of the pump section in which two conveying screws that are arranged on shafts are provided,
    at least one feed section, and
    at least one removal section as constituent parts of the pump section,
  wherein the product chamber has comprises
    at least one parting line having a connection to the surrounding atmosphere, and
    a groove as a channel for hot vapor, the groove comprising at least one sealing ring which seals the hot vapor between the product chamber and the surrounding atmosphere,
  wherein the sealing ring comprises a first wall portion and a second wall portion and the first and the second wall portion are connected by way of a connecting bridge which is arranged at a right angle on the wall portions, and wherein the connecting bridge has openings for vapor to pass through.

2. The screw pump as claimed in claim 1, wherein the first and second wall portions are at least one of parallel with or concentric to one another.

3. The screw pump as claimed in claim 1 comprising two vapor channels through the sealing ring inserted in the groove.

4. The screw pump as claimed in claim 1 comprising at least one parting line between at least two of the conveyor housing part, the feed section (22) or the removal section.

5. The screw pump as claimed in claim 1, wherein the vapor channel has at least one inlet, and at least one outlet.

6. The screw pump as claimed in claim 5, wherein the at least one inlet is a vapor inlet or the inlet is arranged on the upper side of the pump housing.

7. The screw pump as claimed in claim 5, wherein the at least one outlet is one of a concentrate drain or a drain on the underside of the pump housing.

8. The screw pump as claimed in claim 1, wherein the pump is one of a screw pump of single-flow construction having a bearing section, or a screw pump of dual-flow construction having two bearing sections.

9. The screw pump as claimed in claim 8 wherein the shafts of the screw pump of dual-flow construction are borne in a first outside bearing section and borne in a second bearing comprising one of an outer bearing or inner bearing in the pump section.

10. The screw pump as claimed in claim 8 wherein the shafts of the screw pump of single-flow construction are borne in the bearing section and extend into a gear section.

11. The screw pump as claimed in claim 1, wherein the sealing ring is made at least partially from an elastomer.

12. The screw pump as claimed in claim 1, wherein the first wall portion and the second wall portion are arranged parallel to one another.

13. The screw pump as claimed in claim 1, wherein the first wall portion and the second wall portion are arranged concentric to one another.

14. The screw pump as claimed in claim 1, wherein the at least one feed section and the at least one removal section each have a connection flange.

* * * * *